INVENTOR
SUA FOR SUN

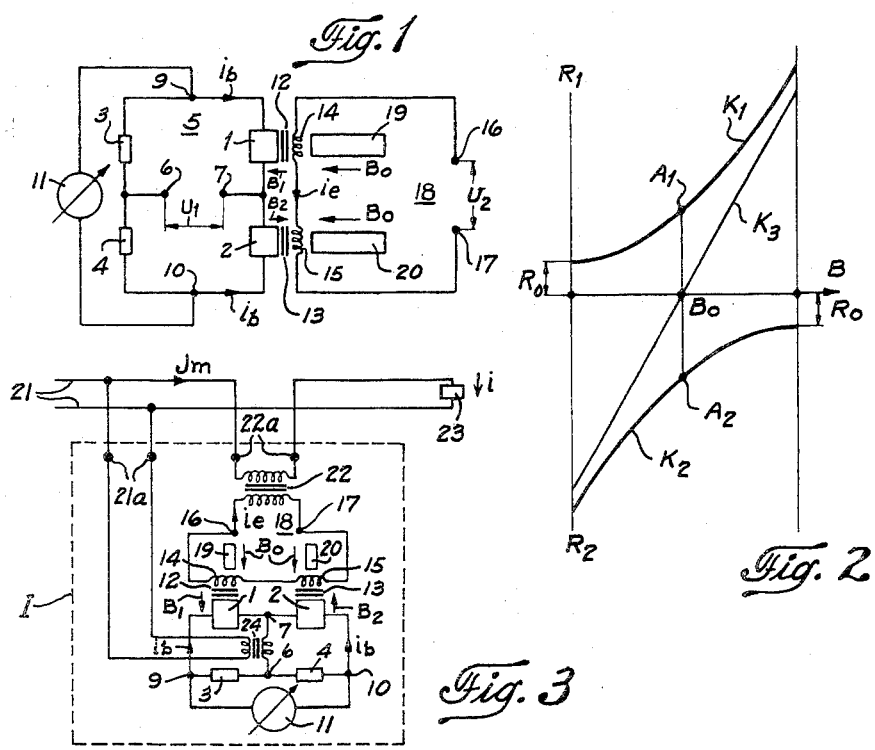

March 13, 1962     SUA FOR SUN     3,024,997
COMPUTER APPARATUS
Filed April 4, 1960     3 Sheets-Sheet 3
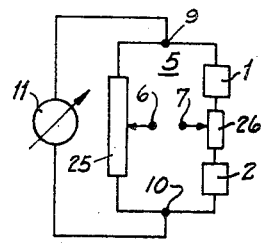
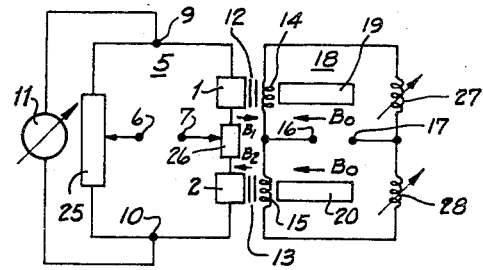
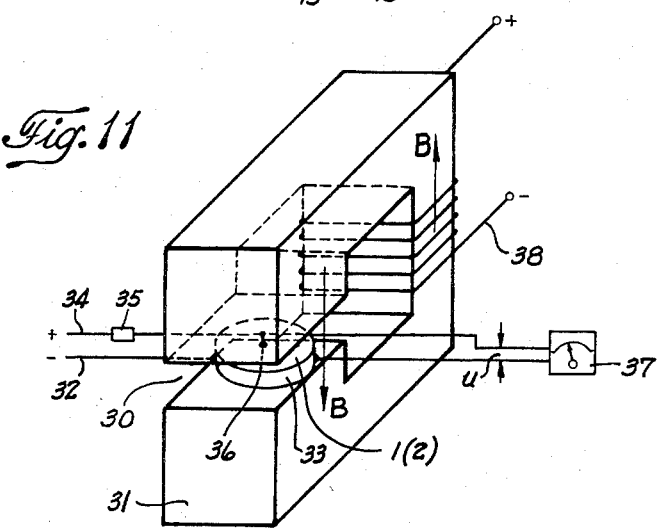
INVENTOR
SUA FOR SUN
BY
Morgan, Finnegan, Durham & Pine
ATTORNEYS.

United States Patent Office 3,024,997
Patented Mar. 13, 1962

3,024,997
COMPUTER APPARATUS
Sua For Sun, Zurich, Switzerland, assignor to Landis & Gyr, A.G., Zug, Switzerland, a body corporate of Switzerland
Filed Apr. 4, 1960, Ser. No. 19,802
Claims priority, application Switzerland Apr. 25, 1959
11 Claims. (Cl. 235—194)

This invention relates to a computing device for the multiplication of multiplicands represented by electrical quantities and more particularly to multiplying devices which use the resistance variation which occurs under the influence of a magnetic field of a resistance member responsive to a magnetic field.

In a known multiplying device of this type, two resistance members which are responsive to a magnetic field are combined with two resistors which have a higher resistance than the resistance members, to form a measuring bridge which is fed by a current which is proportional to a first multiplicand. Allocated to each of the resistance members responsive to a magnetic field is an energizing winding through which flows a current which is proportional to a second multiplicand. The two series-connected energizing windings are adapted in such a manner that the magnetic fields of equal magnitude which are produced thereby act in opposite senses on the resistance members responsive to a magnetic field. Two further series-connected energizing windings are traversed by a constant current and produce two equal and equi-directional magnetic fields which likewise influence the resistance members responsive to a magnetic field. The sum of the fields acting on the resistance members is constant. The difference in the voltages at the two resistance members forms a gauge for the product of the two multiplicands. The object of the circuit described is to linearize the relationship between the magnetic field depending on the second multiplicand and the resistance difference in the resistance members because the resistance/induction characteristic curve only comprises an approximately linear portion. This known multiplying device has the disadvantage that the equations on which the calculation is based are only valid when the magnetic fields acting on the resistance members which are responsive to a magnetic field have comparatively high inductions of the order of magnitude of more than about 5000 gauss. Magnetic fields with such high inductions require, for their production, relatively large cores of magnetic metal in which it is difficult to produce, with sufficient tolerance, the comparatively small air gap in which the resistance members responsive to a magnetic field are accommodated.

The present invention likewise relates to a multiplying device for the multiplication of multiplicands represented by electrical quantities and has for an object the elimination of the disadvantage of the known device of this type, namely, operation with relatively high inductions.

This and other objects and advantages of the invention will be set forth in part hereinafter and in part will be obvious herefrom, or may be learned by practice with the invention, the same being realized and attained by means of the instrumentalities and combinations pointed out in the appended claims.

The invention utilizes the resistance variation of a resistance member occurring under the influence of a magnetic field and comprises a measuring bridge consisting of two identical resistance members which are responsive to a magnetic field and two resistors having a high resistance in comparison with the resistance members, there being allocated to the measuring bridge an energizing circuit which consists of two series-connected energizing windings which influence respectively the field-responsive resistance members. The invention is further characterized in that acting on each resistance member is an additional constant magnetic field; additionally, one of two voltages which represent the multiplicands is applied to the input terminals of the measuring bridge and the other is applied to the series-connected energizing windings, the device functioning in that part of the resistance-induction characteristic curve of the resistance members in which the resistance of the members is in square law relationship to the induction of the fields acting thereon.

The invention consists in the novel parts, constructions, arrangements, combinations and improvements herein shown and described.

Exemplary embodiments of the subject of the invention are illustrated by way of example in the drawings, of which:

FIGURE 1 shows a multiplying device for finding the product of two quantities;

FIGURE 2 is a graph;

FIGURE 3 shows a multiplying device for measuring active power;

FIGURES 4, 4a and 4b show the connection of a multiplying device to a main, for determining active, reactive, and apparent power, respectively;

FIGURE 8 shows an embodiment of the measuring bridge used in the multiplying device;

FIGURES 9 and 10 show two embodiments of the multiplying device with specially constructed energizing circuits; and FIGURE 11 shows the arrangement and circuit connections of a resistance responsive to magnetic field.

Figure 5:
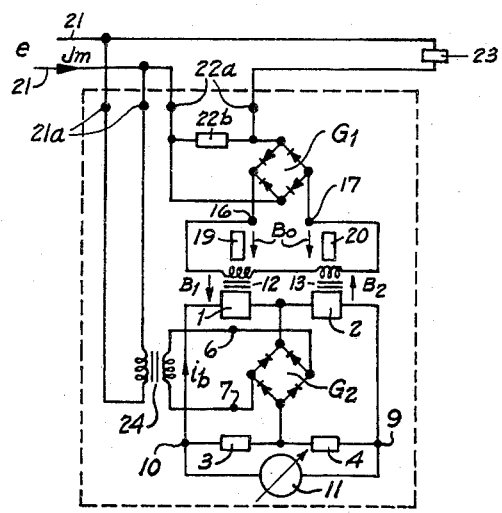
FIGURE 5 shows a multiplying device for measuring apparent power.

In FIGURE 1, elements 1 and 2 represent two resistance members which are responsive to a magnetic field and which are combined with resistors 3, 4 to form a measuring bridge 5, which is fed through terminals 6, 7. Connected to the output terminals 9, 10 of the bridge is a voltmeter 11 which measures the difference in the voltages appearing across the resistance members 1 and 2. The resistance members 1, 2 are each accommodated in an air gap of a magnet core 12, 13 respectively, each of which carries an energizing winding 14, 15 respectively. These windings are connected in series and form an energizing circuit 18 which is fed through input terminals 16, 17. The energizing windings 14, 15 are connected in such a manner that the fields $B_1$, $B_2$ produced thereby are of equal magnitude and equal to B. In addition, allocated to each resistance member 1, 2 is a constant magnetic field $B_0$, which is produced, for example, by a permanent magnet 19, 20 respectively. The arrangement is such that acting on the one resistance member is the sum and on the other the difference of the magnetic fields $B_1$, $B_0$ and $B_2$, $B_0$ respectively allocated thereto. It is known that the characteristic curve of the magnetic-resistance variation of magnetic-responsive resistance members is in part quadratic. The characteristic curve $K_1$ for the resistance member 1 is represented in the graph of FIGURE 2. Because of the induction $B_0$ of the constant magnetic field there results the working point $A_1$. Since, by hypothesis, the characteristic curves of the two resistance members 1, 2 should be as identical as possible and since the members are connected in such a manner that they counteract one another, the characteristic curve $K_2$ for the resistance member 2 is drawn in FIGURE 2 so that it is identical to the curve $K_1$ but with negative ordinates and a reversal about the working-point ordinate associated with the induction $B_0$. As can be seen from the graph of FIGURE 2, the characteristic curve obtained for the measuring bridge circuit 5 is the curve $K_3$ which results from the addition of the ordinates of the two curves $K_1$, $K_2$ and which is linear.

From FIGURE 1 it can be seen that an induction $B_a = B_0 + B_1$ is effective on the resistance member 1 and an induction $B_b = B_0 - B_2$ on the resistance member 2. As regards the characteristic curve $K_1$, which is quadratic in the range in question, $$R_1 = R_0 + m(B_0 + B_1)^2$$

as regards the characteristic curve $K_2$ correspondingly $$R_2 = R_0 + m(B_0 - B_2)^2$$

in which $R_0$ is equal to the resistance of the resistance member 1 or 2 with the induction nil, which resistance was assumed to be equal for both resistance members, and $m$ represents a constant which is likewise assumed to be equal for both resistance members. As indicated above, the equation for the characteristic curve $K_3$ is obtained by subtracting the two equations given one from the other.

$$R_1 - R_2 = 4mB_0B$$

that is to say the characteristic curve $K_3$ is in fact rectilinear.

With the circuit shown in FIGURE 1, active, reactive and apparent powers can be measured if provision is made for corresponding signals to be applied to the two inputs 6, 7 or 16, 17 of the multiplying device. For example, FIGURE 3 illustrates a multiplying device for measuring the active power in a single-phase alternating-current main 21. In this figure the same reference numerals as in FIGURE 1 are used to the extent necessary for identifying the multiplying device. Applied to the input 16, 17 of the energizing circuit 18, preferably through a transformer 22, is a measuring current $i_e$ which is proportional to the current $i$ flowing through a load 23 while applied to the input 6, 7 of the measuring bridge 5, likewise preferably through a transformer 24, is a current $2i_b$ which is proportional to the mains voltage $e$.

The capability of the basic arrangement of FIGURE 3 for the measurement of active, reactive and apparent power is illustrated in FIGURES 4, 4a and 4b, respectively. Considering first FIGURE 4, it can be shown that the current flowing in terminals 16, 17 will be in phase with the load current flowing through load 23, while the current flowing through terminals 6, 7 will be phase-displaced by 180 degrees with respect to the mains voltage $e$. This result obtains in part from the utilization of transformer 22 (including inductance L) and certain inductance effects derived from said inductance and inductance of windings 14 and 15. Under these conditions the output voltage measured at terminals 9, 10 by voltmeter 11 contains a direct current component which is proportional to the active power. The same result may also be obtained by eliminating transformer 24 and employing a direct connection to the mains voltage.

To measure reactive power the transformer 22 is replaced by an ohmic resistance $22b$ as shown in FIGURE 4a. In this case it may be shown that the output voltage contains a direct-current component proportional to the reactive power, which component is measurable with direct-current instrument 11.

A circuit for measuring apparent power is shown schematically in FIGURE 4b and the explanation thereof may be followed by reference to the more detailed circuit of FIGURE 5. As shown therein, the inputs 16, 17 and 6, 7 are supplied through respective rectifiers $G_1$ and $G_2$ with voltages proportional to the load current flowing in load 23 and to the main line voltage $e$. The rectifier $G_1$ is connected on the input side to an ohmic resistance $22b$ traversed by the load current and rectifier $G_2$ through transformer 24, the primary of which is connected to the line voltage $e$. The current in the energizing circuit and in the measuring bridge are respectively proportional to the line current and line voltage, so that at output 9, 10 there will be a direct current voltage that is a measure of the apparent power. This voltage is measured with the voltmeter 11.

In polyphase mains, at least two of the multiplying devices described should be provided, the inputs 6, 7 and 16, 17 of which should be connected according to the particular computation to be solved and the outputs 9, 10 of which are connected in series with an instrument 11 which indicates the sum of the output measurements.

Figure 6:
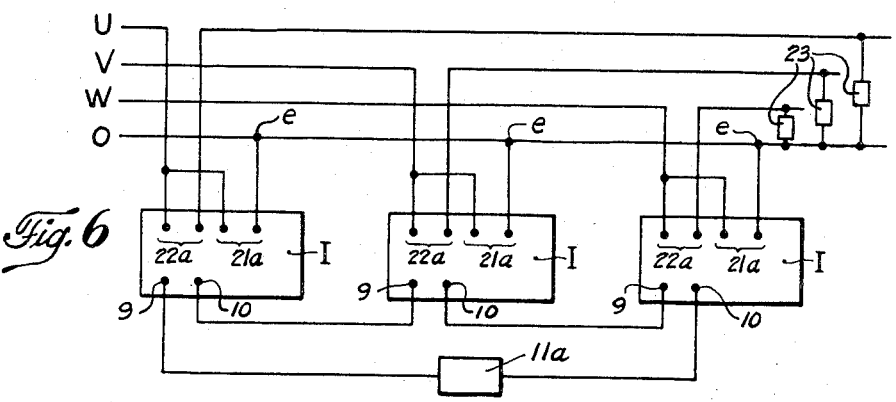
FIGURE 6 shows a circuit arrangement for measuring power in a four-conductor three-phase alternating-current main.
Figure 7:
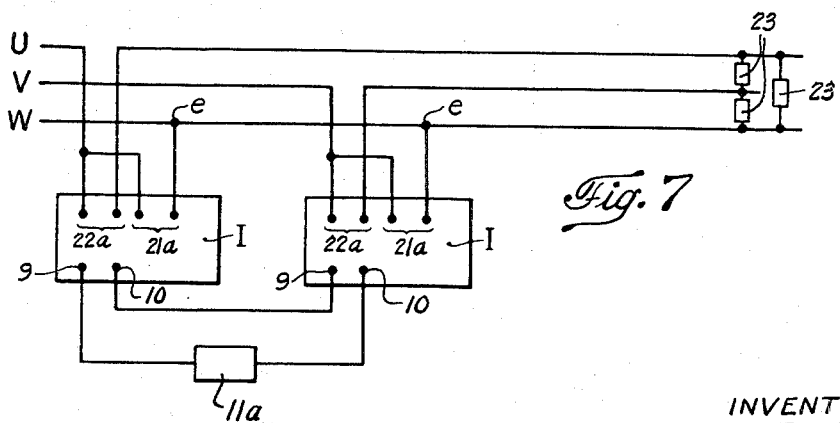
FIGURE 7 shows a circuit arrangement for measuring power in a three-conductor two-phase alternating-current main.

FIGURES 6 and 7 each show a circuit arrangement for measuring power in a multiconductor alternating-current main, FIGURE 6 representing a four-conductor three-phase alternating-current main and FIGURE 7 a three-conductor two-phase alternating-current main. As may be seen in these figures, the inputs, comprising current terminals $22a$ and voltage terminals $21a$, of each multiplying device I associated with a particular phase conductor U, V, W, are connected to a voltage proportional to the current in that conductor, and to a voltage proportional to the voltage between the latter and a neutral conductor O, respectively.

In order to be able to balance any inequalities in the resistance members 1, 2 which are responsive to a magnetic field, an embodiment of the measuring bridge 5 such as is shown in FIGURE 8 is preferably used. The resistors, 3, 4 of FIGURES 1, 3 are here replaced by the potentiometer 25 while a potentiometer 26 is connected between the resistance members 1, 2 which are responsive to a magnetic field. The resistance values of the potentiometers 25 and 26 are of the order of magnitude of those of the resistors 3, 4 and of the resistance members 1, 2, respectively, in order that the bridge current may not be influenced by variations in the resistance values of the resistance members 1, 2. Both potentiometers are wound with resistance wire which is insensitive to temperature. They should be adjusted in such a manner that when magnetic fields of equal strength are in action, the voltage at the output 9, 10 of the measuring bridge 5 is zero over the whole operating range.

In addition to the measuring bridge 5, the energizing circuit 18 also requires a possibility of balancing in order that the fields produced by the energizing coils 14, 15 may be equal to one another. In the case of alternating-current signals, the circuit shown in FIGURE 9 may be used for this purpose. The energizing coils 14, 15 are connected in series with adjustable balancing inductances 27, 28. In order that the currents through the energizing coils 14, 15 may be adjusted independently of one another, they are fed in parallel. With direct-current signals, the circuit shown in FIGURE 10 may be used. In this, a potentiometer 29 serves as a balancing member.

As FIGURE 11 shows, the resistance 1 (2) responsive to magnetic field is centrally arranged in the gap 30 of the magnet 31. A conductor 32 is connected to an edge electrode 33, and a conductor 34 to a center electrode 36 by way of a resistance 35. The current $i$ traversing it depends in intensity on the magnitude of the resistance of the resistor, which in turn is determined by the strength of the magnetic field, so that with variable magnetic field strength B, the resistance of the resistor responsive to magnetic field is varied correspondingly. The voltage $u$ associated with the current $i$ can be read off on the voltmeter 37. The magnetic field is generated by the energizing winding 38 and its associated source of voltage. For clarity, the magnetic member has not been drawn laminated.

The invention is not restricted to the embodiments described by way of example but may also be used when certain conditions are present, such as symmetrical loading, which are favorable to the measurement of the power and permit a simplification of the circuit. Thus it is possible to manage with only one multiplying device instead of two or three to measure the active or wattless power in three-phase mains with equally-loaded phases. The multiplying devices according to the invention have the advantage over the known ones of working with much lower inductions. Consequently, the magnet cores are much smaller and can now be produced from magnetic oxide material, ferrites being particularly suitable for this, which would become saturated and useless at the relatively high induction values otherwise usual. The air gap in which the resistance members responsive to a magnetic field are accommodated, can be brought accurately to size by a simple grinding operation with this material. Since the output values of the multiplying devices described are delivered in the form of electrical quantities, they are particularly suitable for regulating and telemetering purposes.

It is to be understood that multiplying as contemplated by the invention includes multiplication by a reciprocal (division) as well as analogous operations such as squaring.

The invention in its broader aspects is not limited to the specific mechanisms shown and described but departures may be made therefrom within the scope of the accompanying claims without departing from the principles of the invention and without sacrificing its chief advantages.

What is claimed is:

1. A multiplying device for multiplying two quantities represented electrically, comprising a plurality of magnetically responsive resistances energized according to one of said quantities, magnetic means in juxtaposition with said magnetically responsive resistances for subjecting said resistances to a magnetic field, a circuit energized by the other of said quantities and connected to said magnetic means for energizing said magnetic means in accordance with said other quantity, said magnetic means also including means for subjecting said resistances to a constant magnetic field, and output means responsive to said resistances for indicating said multiplication.

2. A multiplying device according to claim 1, in which said magnetically responsive resistances are connected in a bridge circuit, the input terminals of which are energized by said one quantity and the output terminals of which are connected to said output means.

3. A multiplier according to claim 1, in which said magnetic means comprise windings associated respectively with said magnetically responsive resistances.

4. A multiplier according to claim 1, in which said magnetic means comprise a pair of series-connected windings, each energized by a current related to said other quantity.

5. A multiplying device for the multiplication of multiplicands represented by electrical quantities, using the variation in resistance under the influence of a magnetic field of a resistance member which is responsive to said magnetic field, which multiplying device contains a measuring bridge which is fed with direct current, and includes two input terminals, two identical resistance members which are responsive to a magnetic field and two resistors which have a high resistance value in comparison with the resistance members, characterized in that allocated to said measuring bridge is an energizing circuit which comprises two series-connected energizing windings each of which influences one of the said two resistance members, an additional constant magnetic field acting on each resistance member, two voltages representing said multiplicands, one of which is applied to the input terminals of said measuring bridge and the other of which is applied to the series-connected energizing windings, said multiplier operating in that part of the resistance-induction characteristic curve of said resistance members in which the resistance value of said resistance members is in quadratic relationship with the induction of the fields acting thereon.

6. A multiplying device as claimed in claim 5, characterized in that said voltages corresponding to said multiplicands are applied both to said measuring bridge and to said energizing circuit through respective transformers.

7. A multiplying device as claimed in claim 5, for measuring the active, reactive and apparent power in plural-phase mains, characterized in that the outputs of a plurality of said multiplying devices and an instrument which indicates the sum of the individual output voltages, are connected in series.

8. A multiplying device as claimed in claim 5, characterized in that said voltage corresponding to one multiplicand is applied to said measuring bridge through two potentiometers.

9. A multiplying device as claimed in claim 5, characterized in that at least one balancing inductance is provided in said energizing circuit, said inductance being connected in series with said energizing windings.

10. A multiplying device as claimed in claim 5, characterized in that said voltage corresponding to one multiplicand is applied between said energizing windings of said energizing circuit and a tap of potentiometer which is connected in series with said energizing windings.

11. A multiplying device as claimed in claim 5, characterized in that said energizing windings allocated to said resistance members are each provided on a magnet core of magnetic oxide material.

No references cited.